United States Patent [19]

Porter et al.

[11] 4,273,739

[45] Jun. 16, 1981

[54] METHOD OF DEFORMING THERMOPLASTIC POLYMERS USING AMMONIA AS A REVERSIBLE PLASTICIZER

[75] Inventors: Roger S. Porter; Anagnostis E. Zachariades, both of Amherst, Mass.

[73] Assignee: The United States of America as represented by the Secretary of the Navy, Washington, D.C.

[21] Appl. No.: 56,767

[22] Filed: Jul. 12, 1979

[51] Int. Cl.$^3$ ............................................. D01F 1/02
[52] U.S. Cl. ................................. 264/211; 260/32.4; 264/102; 264/210.6; 528/490
[58] Field of Search ............... 264/83, 101, 102, 210.3, 264/210.6, 211, 343, 320, 176 F; 528/490; 260/32.4, 32.6 NA; 8/130.1

[56] References Cited

U.S. PATENT DOCUMENTS

| | | | |
|---|---|---|---|
| 2,061,565 | 11/1936 | Dreyfus | 264/343 |
| 2,965,437 | 12/1960 | Blomberg | 264/211 |
| 3,852,392 | 12/1974 | Davis et al. | 264/211 |
| 4,129,416 | 12/1978 | Bennett et al. | 8/103.1 |

*Primary Examiner*—Donald E. Czaja
*Assistant Examiner*—W. Thompson
*Attorney, Agent, or Firm*—R. S. Sciascia; P. C. Lall; A. P. Durigon

[57] ABSTRACT

Ammonia is utilized as a reversible plasticizer in the deformation of thermoplastic polyamides so as not to degrade the mechanical properties of the deformed material. It may be retained in the material under pressure and/or low temperature during extrusion or other deformation processes and is spontaneously released with time and at reduced pressure and/or elevated temperature at the end of the process, such as at the exit side of an extruder die.

10 Claims, No Drawings

METHOD OF DEFORMING THERMOPLASTIC POLYMERS USING AMMONIA AS A REVERSIBLE PLASTICIZER

The present invention relates generally to thermoplastics of the type having interchain hydrogen bonding and to an improved process for deforming these materials.

Plasticizers have been utilized in the past in processing polymers for a wide variety of industrial applications. In the case of the polyamide family of materials, the hydrogen bonding between amide groups of adjacent chains generally restricts the feasibility of employing these plasticizers to those situations where relatively low molecular weight compositions and high temperatures are involved. Thus the choice of an appropriate plasticizer depends, among other variables, on the ability to withstand high temperatures and to interrupt the interchain hydrogen bonding. Compounds which can be effectively utilized with nylon are thus generally polar and of low volatility.

One of the serious disadvantages of resorting to additives having the aforementioned characteristics is that the plasticizer remains in the nylon after the processing operation and tends to degrade the mechanical properties of the deformed material. Therefore, it is desirable, generally, to remove the plasticizer after the processing operation and volatile plasticizers may be used to this end. Such plasticizers can aid in the processing yet be subsequently removed for enhanced final properties. One of the shortcomings of employing volatile plasticizers, however, is that they cannot be readily handled in conventional material drawing processes.

It is accordingly an object of the present invention to provide a reversible plasticization technique for use in the deformation of high molecular weight thermoplastic polymers, particularly during extrusion.

Another object of the present invention is to provide a plasticization process that can be used in the extrusion or deformation of thermoplastics having interchain hydrogen bonding.

Another object of the present invention is to provide a solid state extrusion process for polyamides and similar materials employing a plasticizer which does not remain in the deformed material.

Another object of the present invention is to provide a reversible plasticization technique for the extrusion of high molecular weight materials wherein the plasticizer is readily removed from the deformed material such as at the exit of an extrusion die.

Briefly, and in general terms, the above objects of invention are accomplished by utilizing as the plasticizer anhydrous ammonia. In one illustrative procedure, nylon-6 was exposed to ammonia at room temperature for 5-6 hours in a pressure vessel in which the relative vapor pressure of ammonia was ~1 MPa. After this exposure, the nylon-6 was cooled to a comparatively low temperature so as to insure retention of the ammonia during transfer of the material to the extruder. Continued retention during the extrusion process was accomplished by having the Instron equipment pressurized to $> \sim 5.5$ MPa, which is approximately the vapor pressure of ammonia at 95° C. Desorption of ammonia from the deformed nylon occurred spontaneously at the exit of the extrusion die which was at atmospheric pressure.

Anhydrous ammonia has been used in the past for the plasticization of wood. It is a suitable plasticizer for the solid state extrusion of nylons because it may be readily retained in this material under pressure during extrusion and subsequently removed after the deformation process has been completed.

It has been found that the incorporation of ammonia in preformed nylon fibers prior to extrusion alleviates significantly the processing difficulties encountered with untreated nylons and further provides rapid extrusion of highly oriented extrudates.

In one application of the present invention to the solid state co-extrusion of nylon-6 with the high density polyethylene (HPDE), as previously alluded to, nylon ribbons 0.2 mm thick and 9.5 mm wide were exposed to ammonia at room temperature for 5 to 6 hours in a suitable pressure vessel which maintained the ammonia at its vapor pressure of approximately 1 MPa. Thermogravimetric analysis indicated that the amount of ammonia absorbed by the nylon 6 was approximately 18 wt % and was in near stoichiometric ratio with the total number of hydrogen bonds in the polymer. The rate of ammonia absorption depends on the vapor pressure of the ammonia at which the nylon 6 samples were subjected. At equilibrium the amount of ammonia absorbed by nylon-11 on this basis would be 10 wt %. The rate of ammonia desorption after pressure removal, it was found, increased with temperature and decreased with polyamide thickness.

The nylon 6 films treated with ammonia were next inserted within longitudinally-split high density polyethylene billets ($M_w = 59,900$, $M_n = 19,000$) which were previously chilled in liquid nitrogen ($-193°$ C.). Since ammonia boils at $-35°$ C., cooling to below this temperature is sufficient to insure the retention of ammonia in the material during its transfer to the deformation apparatus. These billets maintained the temperature of the nylon ribbons sufficiently cool to insure the retention of the ammonia while the composite material was transferred to the extruder.

The sandwich assembly was loaded in an Instron rheometer and extruded through a conical brass die of included entrance angle of 20° and nominal extrusion draw ratio (EDR) 12. The extrusion pressure was 0.20 GPa and the temperature 95° C. i.e. about 124° C. below the melting point of nylon 6. On exiting the extrusion die the ammonia in time volatilized quantitatively from the deformed nylon 6. For comparison purposes, the same conditions were duplicated utilizing untreated nylon 6 films, but the extrusion process was unsuccessful since the unplasticized nylon is not readily deformed at such temperatures and pressures.

The oriented and transparent films that were produced by the above process were of EDR 11.6 and thermal analysis indicated that the crystallinity increased from about 23.5% for the originally isotropic nylon 6 film to about 53% and the melting point from near 219° C. to near 223° C. The extruded films had a tensile modulus of 13 GPa at 0.1% strain and a birefringence $8.25 \times 10^{-2}$.

The above plasticization process can be used with other deformation techniques and with thermoplastics with interchain hydrogen bonding to produce oriented and shaped filaments, fibers or films with enhanced properties.

Additional reversible plasticizers suitable for use in the present invention may be found among other low molecular weight and volatile amines. As a class, these plasticizers should have strong enough interactions to reduce the interchain hydrogen bonding and volatile enough to subsequently diffuse out of the polymer after processing.

It would be pointed out that the ammonia can be placed in the polymer at any temperature below the critical temperature of ammonia and can be deformed such as by transfer either under pressure or at low temperature to the extruder.

What is claimed is:

1. In a method of deforming thermoplastic polymers with interchain hydrogen bonding, the steps of
    exposing the polymer to ammonia so as to have sufficient ammonia absorbed therein to serve as a plasticizer;
    deforming said treated polymer in a manner that permits said ammonia to remain in said polymer during the deformation process; and
    releasing said ammonia thereafter from the deformed polymer.

2. In a method as defined in claim 1 wherein the amount of said ammonia absorbed is stoichiometrically related to the number of hydrogen bonds in the polymers.

3. In a method of extruding thermoplastic polymers having interchain hydrogen bonding, which contain a plasticizer the improvement of
    utilizing as the plasticizer ammonia which is absorbed in the polymer prior to its extrusion and released thereafter from the deformed polymer at the exit side of the die whereby the mechanical properties of the deformed polymer are not affected by the presence therein of the plasticizer.

4. In a method for extruding polymers having interchain hydrogen bonding, which method employs a plasticizer in the extruding process, the steps of
    impregnating said polymer with ammonia in an amount sufficient to have said ammonia behave as a plasticizer; and
    maintaining said impregnated polymer under conditions such that during the extrusion process the ammonia is retained therein until it is released at the exit side of the die.

5. In a method as defined in claim 4 wherein said polymer is nylon-6 and the amount of said ammonia absorbed is approximately 18 wt %.

6. In a method as defined in claim 4 wherein said polymer is nylon-11 and the amount of said ammonia absorbed is approximately 10 wt %.

7. In a method of deforming thermoplastic materials with interchain hydrogen bonding, the steps of
    exposing said material to anhydrous ammonia under conditions which result in a sufficient amount of said ammonia being absorbed in the material to act as a plasticizer;
    controlling the temperature of the material to assure the retention thereof of said ammonia during the transfer of the material to the deformation apparatus;
    maintaining the temperature/pressure of said material in the deformation apparatus so as to assure the continued retention thereof of said ammonia; and
    permitting said ammonia to be subsequently released from the deformed material.

8. In a method as defined in claim 7 wherein said material is nylon-6 and the amount of said ammonia absorbed therein is approximately 18 wt %.

9. In a method as defined in claim 7 wherein said material is nylon-11 and the amount of said ammonia absorbed therein is approximately 10 wt %.

10. A method as set forth in claims 1, 3 or 4 wherein the polymers are polyamides.

* * * * *